United States Patent
Lee et al.

(10) Patent No.: US 9,313,021 B2
(45) Date of Patent: Apr. 12, 2016

(54) SECRET COMMUNICATION METHOD WITH SELF-AUTHENTICATION CAPABILITY

(71) Applicant: NATIONAL CHIAO TUNG UNIVERSITY, Hsinchu (TW)

(72) Inventors: Che-Wei Lee, Kaohsiung (TW); Wen-Hsiang Tsai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 344 days.

(21) Appl. No.: 14/013,627

(22) Filed: Aug. 29, 2013

(65) Prior Publication Data

US 2015/0067870 A1 Mar. 5, 2015

(51) Int. Cl.
*G06F 21/00* (2013.01)
*H04L 9/00* (2006.01)
*H04L 29/06* (2006.01)

(52) U.S. Cl.
CPC .. *H04L 9/00* (2013.01); *H04L 63/06* (2013.01)

(58) Field of Classification Search
USPC ........ 726/26; 713/168, 179, 185, 189; 380/28
See application file for complete search history.

(56) References Cited

U.S. PATENT DOCUMENTS

| | | | |
|---|---|---|---|
| 6,519,352 B2 | 2/2003 | Rhoads | |
| 6,744,907 B2 | 6/2004 | Rhoads | |
| 6,757,406 B2 | 6/2004 | Rhoads | |
| 7,184,572 B2 | 2/2007 | Rhoads et al. | |
| 7,460,726 B2 | 12/2008 | Levy et al. | |
| 7,870,393 B2 | 1/2011 | Moskowitz et al. | |
| 2003/0208541 A1* | 11/2003 | Musa | G06Q 10/10 709/205 |
| 2004/0179686 A1* | 9/2004 | Matsumura | H04L 9/085 380/44 |
| 2006/0242086 A1* | 10/2006 | Deolalikar | G06Q 20/3674 705/67 |
| 2007/0024527 A1* | 2/2007 | Heikkinen | A63F 13/10 345/9 |
| 2007/0150788 A1* | 6/2007 | Zhuyan | H04L 1/0071 714/749 |

(Continued)

FOREIGN PATENT DOCUMENTS

| | | |
|---|---|---|
| TW | 200836124 A | 9/2008 |
| TW | 201010408 A | 3/2010 |
| TW | 201025225 A | 7/2010 |

OTHER PUBLICATIONS

Che-Wei Lee and Wen-Hsiang Tsai; "A Covert Communication Method via Spreadsheets by Secret Sharing with a Self-authentication Capability", The Journal of Systems and Software 86 (2013), p. 324-334, Aug. 30, 2012.

(Continued)

*Primary Examiner* — Joseph P Hirl
*Assistant Examiner* — Sayed Beheshti Shirazi
(74) *Attorney, Agent, or Firm* — Rosenberg, Klein & Lee

(57) ABSTRACT

A secret communication method with a self-authentication capability is provided, which comprises steps of dividing a secret message into a plurality of secret segments; converting each of the secret segments into (k+1) shares, wherein k is a positive integer; embedding the shares into a media carrier; selecting every k shares among the (k+1) ones to compute (k+1) copies in value; and checking if the (k+1) copies in value are the same. If the (k+1) copies in value are the same, then the secret message is shown. Otherwise, at least one mark will be utilized to replace the secret message while the part of the secret message which is not falsified can still be correctly shown. By employing the method, the integrity and fidelity of the hidden secret message can thus be verified, thereby achieving a new covert communication process performing both information hiding and self-authentication capability.

12 Claims, 6 Drawing Sheets

(56) References Cited

U.S. PATENT DOCUMENTS

| | | | | |
|---|---|---|---|---|
| 2007/0160198 | A1* | 7/2007 | Orsini | H04L 9/085 380/28 |
| 2008/0179876 | A1* | 7/2008 | Gaffney | G06F 21/64 283/72 |
| 2008/0205637 | A1* | 8/2008 | Kurihara | H04L 9/085 380/28 |
| 2008/0270370 | A1* | 10/2008 | Castellanos | G06F 21/6227 |
| 2010/0054458 | A1* | 3/2010 | Schneider | H04L 9/085 380/28 |
| 2010/0217978 | A1* | 8/2010 | Schneider | H04L 9/085 713/168 |
| 2010/0228991 | A1* | 9/2010 | Billings | G06F 21/34 713/185 |
| 2010/0306614 | A1* | 12/2010 | Klim | H04L 1/004 714/752 |
| 2011/0126291 | A1* | 5/2011 | Araki | H04L 9/085 726/26 |
| 2011/0249813 | A1* | 10/2011 | Lee | G06T 1/0021 380/28 |
| 2011/0264918 | A1* | 10/2011 | Nagura | H04L 9/3247 713/179 |
| 2013/0077817 | A1 | 3/2013 | Naparstek et al. | |
| 2013/0163668 | A1* | 6/2013 | Chen | H04N 19/00696 375/240.14 |
| 2013/0339818 | A1* | 12/2013 | Baker | G06F 11/10 714/763 |
| 2014/0019771 | A1* | 1/2014 | Emmett | H04L 9/002 713/189 |
| 2014/0136889 | A1* | 5/2014 | Kuang | G06F 11/1076 714/15 |

OTHER PUBLICATIONS

Che-Wei Lee, "A Study on New Techniques for Image Authentication and Covert Communication for Multimedia Security Applications", in Partial Fulfillment of the Requirements for the Degree of Philosophy in Computer and Information Science in National Chiao Tung University on Sep. 30, 2012.

W. Bender, D. Gruhl, N. Morimoto, A. Lu, "Techniques for Data Hiding", IBM Syst. J., 35 (3-4) (1996) 313-336.

D.C. Wu, W.H. Tsai, "A Steganographic Method for Images by Pixel-Value Differencing", Pattern Recognition Letters, 24 (9-10) (2003) 1613-1626.

C.H. Yang, C.Y. Weng, S.J. Wang, H.M. Sun, "Adaptive Data Hiding in Edge Areas of Images with Spatial LSB Domain Systems", IEEE Transactions on Information Forensics and Security, 3(3) (2008) 488-497.

J. Fridrich, R.DU, "Secure Steganographic Methods for Palette Images", Proc. of 3rd International Workshop Information Hiding, Dresden, Germany, Sep. 1999; also in Lecture Notes in Computer Science, Springer-Verlag, Berlin, 2000, pp. 61-76.

I.S. Lee, W.H. Tsai, "A New Approach to Covert Communication via PDF Files", Signal Processing, 90 (2) (2010) 557-565.

T.Y. Liu, W.H. Tsai, "A New Steganographic Method for Data Hiding in Microsoft Word Documents by a Change Tracking Technique", IEEE Transactions on Information Forensics and Security, 2(1) (2007) 24-30.

C.C. Lin, W.H. Tsai, "Secret Image Sharing with Steganography and Authentication", The Journal of Systems and Software, 73 (3) (2004) 405-414.

* cited by examiner

| Student ID | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Grade | 66 | 75 | 25 | 60 | 85 | 91 | 88 | 48 | 50 | 89 | 55 | 62 | 70 | 86 |

| Student ID | 287 | 288 | 289 | 290 | 291 | 292 | 293 | 294 | 295 | 296 | 297 | 298 | 299 | 300 |
|---|---|---|---|---|---|---|---|---|---|---|---|---|---|---|
| Grade | 96 | 73 | 73 | 62 | 59 | 66 | 84 | 32 | 89 | 51 | 60 | 85 | 97 | 80 |

| Student ID | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Grade | 66 | 25 | 25 | 60 | 85 | 87 | 88 | 91 | 50 | 89 | 55 | 62 | 58 | 86 |

Fig. 4A

| Student ID | 287 | 288 | 289 | 290 | 291 | 292 | 293 | 294 | 295 | 296 | 297 | 298 | 299 | 300 |
|---|---|---|---|---|---|---|---|---|---|---|---|---|---|---|
| Grade | 96 | 2 | 73 | 62 | 58 | 66 | 84 | 32 | 89 | 51 | 73 | 85 | 91 | 80 |

Fig. 4B

SECRET COMMUNICATION METHOD WITH SELF-AUTHENTICATION CAPABILITY

BACKGROUND OF THE INVENTION

1. Field of the Invention

The present invention relates to a secret communication method, and more particularly to a secret communication method using numeric data as secret message carrier and having self-authentication capability.

2. Description of the Prior Art

Generally speaking, in the era of network nowadays, various communication methods are highly involved with the Internet. And under circumstances like these, various files, such as text, voices and images, can thus be transmitted via networks.

However, it should be noticed that network communication usually lacks of sufficient security. To solve the problem, prior arts propose to encrypt secret information (i.e. secret message) before it is transmitted. And, the recipient can decrypt the encrypted message to obtain the original information at the receiving side. Nevertheless, although encryption can increase security of information transmission, encrypted data is similar to random code and is likely to be recognized and depredated. Therefore, prior arts further disclose a stegano-technology, which increases information security via hiding secret information into a media carrier to yield a stego-file. After the stego-file is transmitted to the recipient, and the recipient decrypts the stego-file, then the secret information or the secret message can be retrieved. As a result, the stegano-technology nowadays is widely used to reduce the probability of arousing suspicion and the secret information or the secret message being hidden in the media carrier is less likely to be recognized than encrypted information.

A U.S. Pat. No. 7,870,393 disclosed a steganographic method and device, which proposes to use hash codes for verifying the decrypted secret message being retrieved at the receiving side is correct or not. However, such kind of method only determines if the secret message is hacked or destroyed. That is to say, when only a small portion of the secret message is missing while the rest are still transmitted correctly, the conventional method cannot deal with it, but have to abandon the whole secret message.

On account of the above, it should be obvious that there is indeed an urgent need for the professionals in the field to develop a new secret communication method that is capable of having a self-authentication capability. Meanwhile, if any portion of the original message is correct, such portion can be kept and showed even when some portion of the message may have possibly been destroyed. In this way, the above-mentioned problems occurring in the prior design can be solved.

SUMMARY OF THE INVENTION

In order to overcome the above-mentioned disadvantages, one major objective in accordance with the present invention is provided for a novel secret communication method with a self-authentication capability, which involves with a special secret sharing technology to convert an original secret message into a predefined number of secret shares and embed them into a spreadsheet composed of a plurality of numeric data such that the secret message can be hidden in the numeric data without being recognized.

Another objective of the present invention is provided for a novel secret communication method with a self-authentication capability, which further is capable of recovering the original secret message through merely the embedded shares and predefined parameters without any other information or data needed, thereby reducing the complexity, operative time and cost of the method.

Still another objective of the present invention is provided for a novel secret communication method with a self-authentication capability, which utilizes the embedded secret shares to compute several secret codes in value. By checking the consistency of the copies in value, the embedded shares are intact or not can be easily found and thus achieving the goal of self-authentication capability.

In one aspect, the present invention provides a secret communication method with a self-authentication capability, which comprises steps of dividing a secret message into a plurality of secret segments; converting each of the secret segments into (k+1) shares, wherein k is a positive integer; embedding the shares into a media carrier; selecting every k shares among the (k+1) ones to compute (k+1) copies in value; and checking if the (k+1) copies in value are the same.

According to one embodiment of the present invention, if the (k+1) copies in value are the same, the secret message is shown. Otherwise, at least one mark would be utilized to replace the secret message while the part of the secret message which is not falsified can still be correctly shown.

In one embodiment, the media carrier where the secret shares are embedded can be a spreadsheet which comprises a plurality of numeric data. And these embedded shares are randomly embedded into the spreadsheet and substituted for the numeric data.

According to one embodiment of the present invention, a Shamir's (k, n)-threshold secret sharing scheme is taken when converting each of the secret segments into secret shares and the value of n is set to be equal to (k+1).

Below, the embodiments are described in detail in cooperation with drawings and equations to make easily understood the objectives, technical contents, characteristics and accomplishments of the present invention. Also, these and other objectives of the present invention will become obvious to those of ordinary skill in the art after reading the following detailed description of preferred embodiments. Therefore, it is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 3A shows a schematic diagram of a spreadsheet which includes grades of student ID 1-14 in accordance with one embodiment of the present invention.

FIG. 3B shows a schematic diagram of a spreadsheet which includes grades of student ID 287-300 in accordance with one embodiment of the present invention.

FIG. 4A shows a schematic diagram of the spreadsheet in FIG. 3A after the secret shares are embedded in accordance with one embodiment of the present invention.

FIG. 4B shows a schematic diagram of the spreadsheet in FIG. 3B after the secret shares are embedded in accordance with one embodiment of the present invention.

DESCRIPTION OF THE PREFERRED EMBODIMENTS

Figure 1:
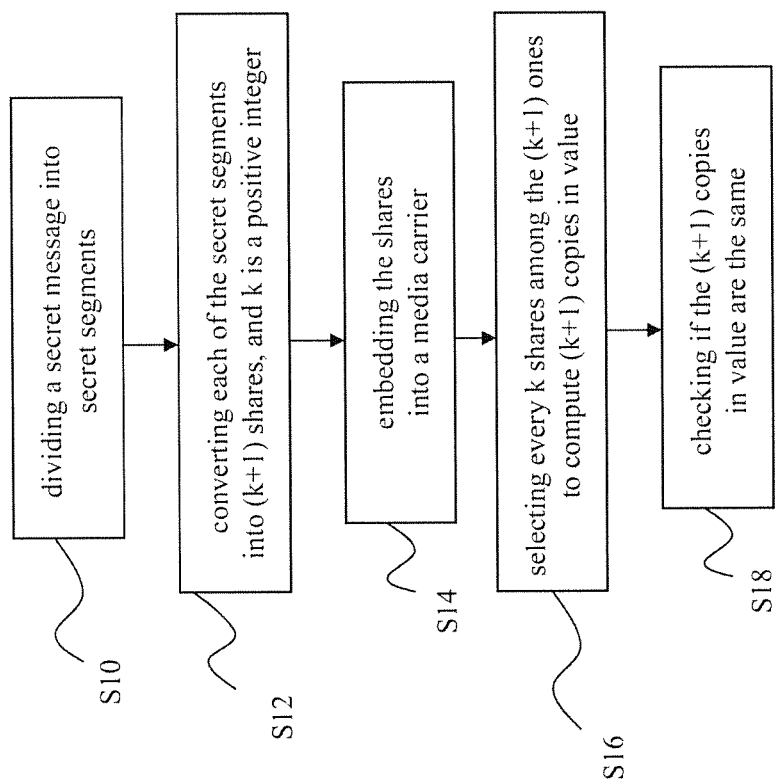
FIG. 1 shows a flow chart of a secret communication method with a self-authentication capability in accordance with one embodiment of the present invention.

Reference will now be made in detail to the preferred embodiments of the present invention, and examples of which are illustrated in the accompanying drawings. Wherever possible, the same reference numbers are used in the drawings and the description to refer to the same or similar parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Please refer to FIG. 1 for a flow chart of a secret communication method with a self-authentication capability in accordance with one embodiment of the present invention. The secret communication method with a self-authentication capability of the present invention comprises steps S10, S12, S14, S16 and S18. In order to specify how the secret communication method with a self-authentication capability of the present invention works, please find referring as FIG. 2 at the same time for further description as set forth below.

Figure 2:
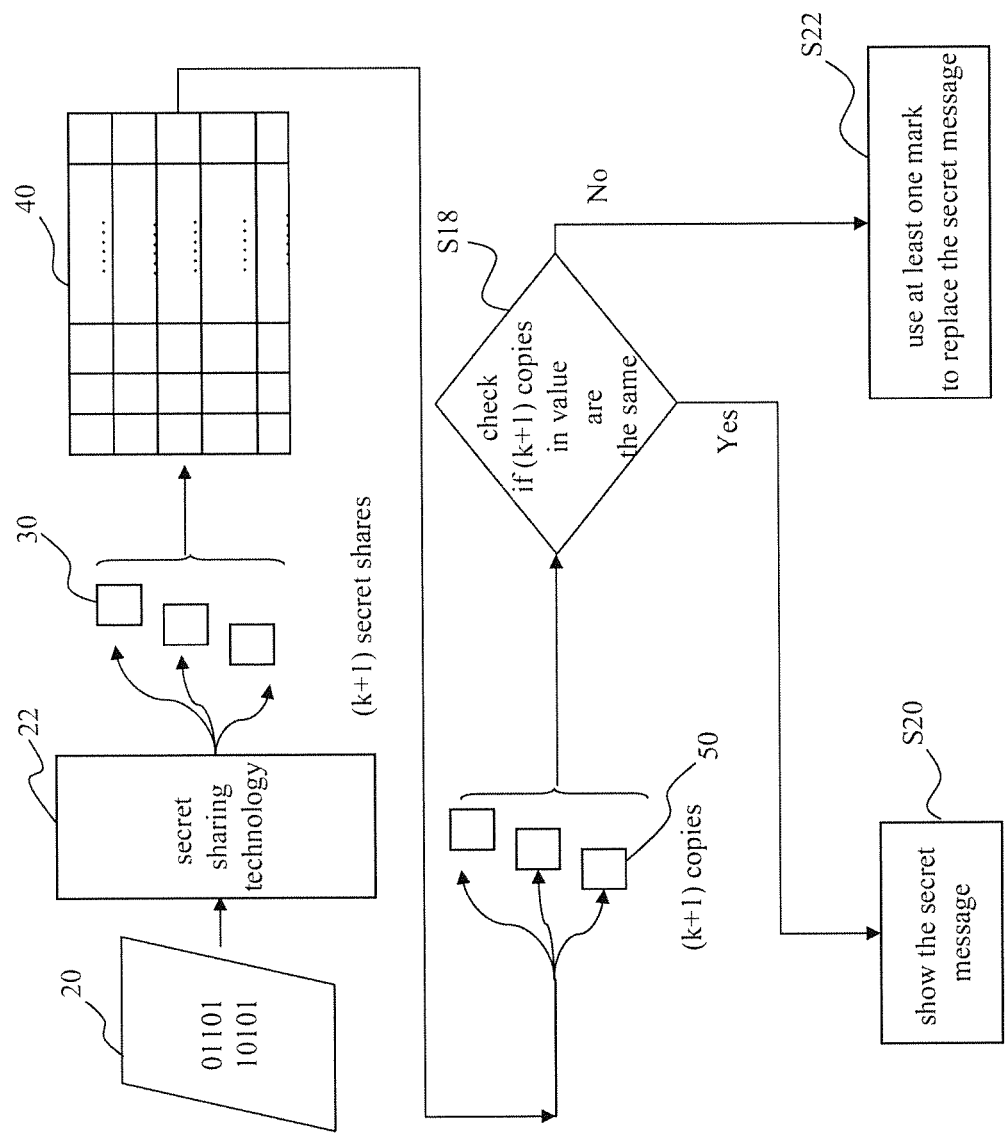
FIG. 2 shows a schematic diagram of a secret communication method with a self-authentication capability in accordance with one embodiment of the present invention.

According to step S10, a secret message is initially taken and divided into a plurality of secret segments. For example, a secret segment 20 of "0110110101" is shown in FIG. 2. Then, as shown in step S12, the secret segment 20 is converted into (k+1) shares 30, and k is a positive integer. According to the embodiment of the present invention, the secret segment 20 is converted into (k+1) shares 30 through a secret sharing technology 22 and the secret sharing technology 22 used in the present invention is Shamir's (k, n)-threshold secret sharing scheme.

Next, as shown in step S14, these secret shares are embedded into a media carrier 40 such that in step S16, every k shares among the (k+1) ones are selected to compute (k+1) copies 50 in value. At last, as shown in step S18, check if the (k+1) copies 50 in value are the same. According to the embodiment of the present invention, if yes, then show the secret message as shown in step S20. Otherwise, use at least one mark to replace the secret message as shown in step S22.

A much more clear description is now provided below to explain the present invention. According to the embodiment of the present invention, assume a secret message is "password: 19841221", which includes 18 characters. Then, these characters are transformed into binary string to have 18*7=126 bits since each ASCII character is composed of 7 bits. Then, the 126 bits are divided into 3 segments with each segment having 42 bits. As such, these 42 bits will be further divided by 7 pieces, and each piece include 42/7=6 bits.

Therefore, the secret message is now divided into the above-mentioned 3 secret segments, which are: "passwo" (i.e. the first secret segment), "rd: 19" (i.e. the second secret segment), and "841221" (i.e. the third secret segment).

Next, the present invention takes the first secret segment "passwo" to explain the techniques proposed hereinafter. By employing the same manners, the second secret segment "rd: 19" and the third secret segment "841221" can also be processed properly. For those who skilled in the art, it shall be obvious and can be easily applied by the same manners. Therefore, as set forth below, according to the embodiment, the present invention merely discloses the proposed techniques in detail for the first secret segment "passwo" and various modifications and variations can be made to the present invention without departing from the scope or spirit of the invention.

In the beginning, the first secret segment "passwo" is converted into a binary string 110011011110111000... (including 42 bits) and each 6 bits as a byte from left to right is sequentially taken to form a plurality of bytes 110011, 011110, 111000.... As such, the binary string is equally divided into a plurality of bytes and each of the plurality of bytes has the same bit length. Next, convert the plurality of bytes into decimal numerals, i.e. 51(110011), 30(011110), 56(111000)... to become a plurality of secret codes. Thus, every 7 secret codes form a group and then will be converted into 8 secret shares through the Shamir's (k, n)-threshold secret sharing scheme with n=k+1; and k=7.

According to the embodiment of the present invention, the plurality of secret codes are converted into 8 secret shares according to Equation (1):

$$F(x_i) = (m_0 + m_1 x_i + m_2 x_i^2 + \ldots + m_{k-1} x_i^{k-1})_{mod\ p} \quad (1)$$

wherein $m_0, m_1 \ldots m_{k-1}$ are the secret codes, $x_i$ is adjustable parameter, p is an initial reference value and $F(x_i)$ is the secret share.

Therefore, as shown in Equation (2):

$$F_1 = F(x_1) = (m_0 + m_1 x_1 + m_2 x_1^2 + \ldots + m_6 x_1^6)_{mod\ p}$$

$$F_2 = F(x_2) = (m_0 + m_1 x_2 + m_2 x_2^2 + \ldots + m_6 x_2^6)_{mod\ p}$$

$$F_3 = F(x_3) = (m_0 + m_1 x_3 + m_2 x_3^2 + \ldots + m_6 x_3^6)_{mod\ p}$$

$$F_4 = F(x_4) = (m_0 + m_1 x_4 + m_2 x_4^2 + \ldots + m_6 x_4^6)_{mod\ p}$$

$$F_5 = F(x_5) = (m_0 + m_1 x_5 + m_2 x_5^2 + \ldots + m_6 x_5^6)_{mod\ p}$$

$$F_6 = F(x_6) = (m_0 + m_1 x_6 + m_2 x_6^2 + \ldots + m_6 x_6^6)_{mod\ p}$$

$$F_7 = F(x_7) = (m_0 + m_1 x_7 + m_2 x_7^2 + \ldots + m_6 x_7^6)_{mod\ p}$$

$$F_8 = F(x_8) = (m_0 + m_1 x_8 + m_2 x_8^2 + \ldots + m_6 x_8^6)_{mod\ p} \quad (2)$$

wherein $F_1, F_2, F_3, F_4, F_5, F_6, F_7, F_8$ are the 8 secret shares. Since these secret shares are expressed by Equation (1) containing a plurality of secret codes, and the Equation (1) is divided by an initial reference value p to obtain a remainder, the initial reference value p must be a prime and be greater than the secret codes $m_0, m_1 \ldots m_{k-1}$. As mentioned above, since the first secret segment is converted into 7 secret codes, which are 51, 30, 56, 45, 60, 11, 23, now it can be computed by setting $m_0=51$, $m_1=30$, $m_2=56$, $m_3=45$, $m_4=60$, $m_5=11$, $m_6=23$ and p=101. For $x_1=1$, $x_2=2$, $x_3=3$, $x_4=4$, $x_5=5$, $x_6=6$, $x_7=7$, $x_8=8$, the secret shares $F_1, F_2, F_3, F_4, F_5, F_6, F_7, F_8$ can be computed according to Equation (2) to obtain $F_1=25$, $F_2=87, \ldots, F_8=91$.

As mentioned above, since the first secret segment is converted into 8 secret shares and the second and third secret segment are applied by the same manners, the original secret message is now converted to be 8*3=24 secret shares. According to the embodiment of the present invention, these 24 secret shares will be embedded into a media carrier, i.e. the spreadsheet comprising 300 students' grades as shown in FIG. 3A and FIG. 3B, wherein FIG. 3A shows the spreadsheet 300a which includes the grades of student ID 1-14, while FIG. 3B shows the spreadsheet 300b which includes the grades of student ID 287-300. Please refer to FIG. 4A and FIG. 4B for a statistic diagram of the spreadsheet including 300 students' grades after embedding the secret shares, wherein the spreadsheet 400a is the result of the spreadsheet 300a after the secret shares are embedded, the spreadsheet 400b is the result of the spreadsheet 300b after the secret shares are embedded, and the column in grey represents where a secret share is embedded.

According to the embodiment of the present invention, when embedding the secret shares into the spreadsheet, these shares are randomly embedded to being directly substituted for the numeric data. Furthermore, it shall be noticed that the number of data being replaced must not be too many to affect its original probability distribution. Alternatively, the data being replaced can be selected to be a less-important part of the numeric data, such as the decimal numbers to maintain its original probability distribution. As a result, based on the principle mentioned above, the grade of student ID number 2 will now be replaced from 75 to 25, the grade of student ID number 6 will now be replaced from 91 to 87, the grade of student ID number 8 will now be replaced from 48 to 91, the grade of student ID number 13 will now be replaced from 70 to 58, the grade of student ID number 288 will now be replaced from 73 to 2, the grade of student ID number 291 will now be replaced from 59 to 58, the grade of student ID number 297 will now be replaced from 60 to 73, and the grade of student ID number 299 will now be replaced from 97 to 91 as shown in FIG. 4A and FIG. 4B.

The process of embedding a secret message into a spreadsheet has been fully described above. Then, the embedded secret message can be recovered via Equation (3):

$$F(x) = \begin{bmatrix} F(x_1)\frac{(x-x_2)(x-x_3)\ldots(x-x_k)}{(x_1-x_2)(x_1-x_3)\ldots(x_1-x_k)} + \\ F(x_2)\frac{(x-x_1)(x-x_2)\ldots(x-x_k)}{(x_2-x_1)(x_2-x_3)\ldots(x_2-x_k)} + \ldots + \\ F(x_k)\frac{(x-x_1)(x-x_2)\ldots(x-x_{k-1})}{(x_k-x_1)(x_k-x_2)\ldots(x_k-x_{k-1})} \end{bmatrix}_{\mod p} \quad (3)$$

wherein $x_1, x_2, \ldots x_k$ are adjustable parameters and p is the initial reference value as defined in Equation (2); $F(x_1)$, $F(x_2) \ldots F(x_k)$ are the k secret shares in value, and $F(x)$, the secret message can then be recovered. In this case, $x_1=1$, $x_2=2$, $x_3=3$, $x_4=4$, $x_5=5$, $x_6=6$, $x_7=7$, $x_8=8$, p=101, $F_1=25$, $F_2=87, \ldots$, and $F_8=91$. As such, it is apparent that Equation (2) can be rebuilt through Eqution (3) and the coefficients $m_0$, $m_1 \ldots m_6$ of Equation (2) can be obtained as $m_0=51$, $m_1=30$, $m_2=56$, $m_3=45$, $m_4=60$, $m_5=11$, $m_6=23$. Next, the present invention converts the decimal numerals of $m_0, m_1 \ldots m_6$ into binary values and sequentially cascade the binary values. As a result, the original first secret segment (1100110111110111000) of "passwo" is thus recovered. Similarly, the second and the third secret segment can be recovered by the same principle mentioned above so as to cascade them all together to get the full secret message.

According to the embodiment of the present invention, the process of self-authenticating the recovered secret message will now be described below. Since in the embodiment, the Shamir's (k, n)-threshold secret sharing scheme is taken as a secret sharing technology and n is assigned to be (k+1) with k=7, n=8, then every k shares among the n shares can be used to compute $C_k^n$ copies in value. As such, according to the embodiment $C_7^8=8$ copies in value, which are taken to compute the $m_0, m_1 \ldots m_6$ secret codes, will be selected to rebuild Equation (2) as described above. If the copies in value, i.e. $m_0$, $m_1 \ldots m_6$ secret codes computed each time are equally the same, then it means the recovered secret message from Equation (3) is true and so the secret message will be shown correctly. Otherwise, as Step S22 in FIG. 2, at least one mark will be used to replace the content of the secret message.

Figure 5:
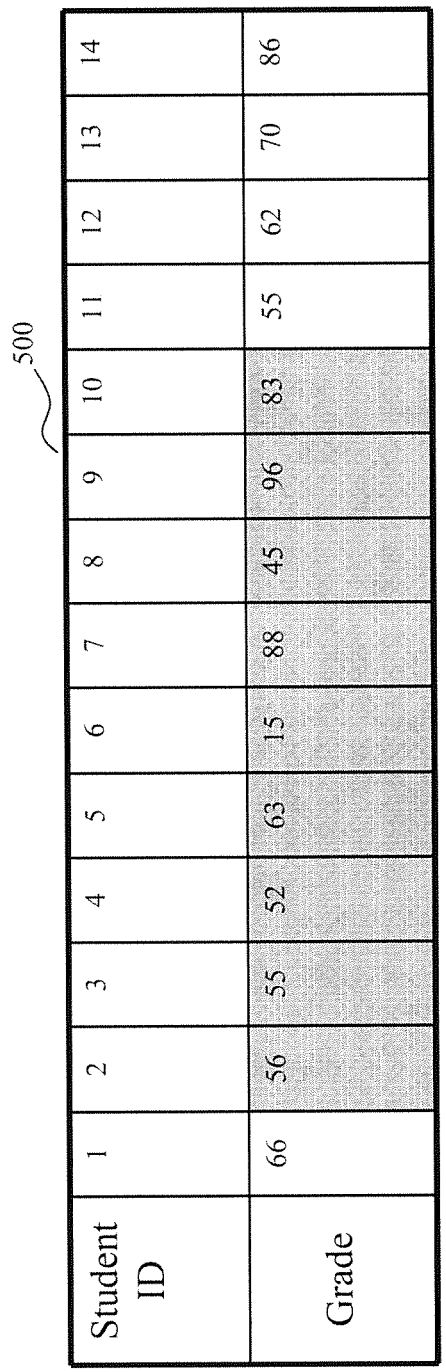
FIG. 5 shows a schematic diagram of a spreadsheet including 300 students' grades when part of the grades are intentionally falsified in accordance with one embodiment of the present invention.
Figure 6:
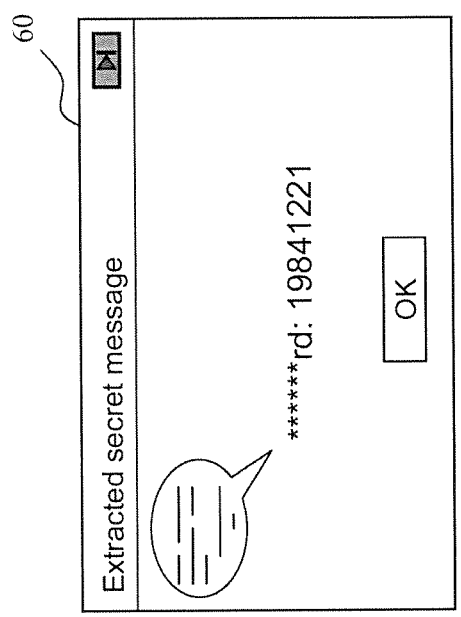
FIG. 6 shows a schematic drawing of the extracted secret message according to FIG. 5 when part of the grades are intentionally falsified in accordance with one embodiment of the present invention.

For example, FIG. 5 shows a diagram of the spreadsheet 500 including 300 students' grades when part of the grades are intentionally falsified, wherein the column in grey represents where the grades are changed. As shown in FIG. 5, it is obvious that grades of the student ID number 2-10 are intentionally hacked to become false data. Since the student ID number 2, 6 and 8 are also to be where the secret shares are embedded (with referring to FIG. 4A) and the grades thereof are changed now, the secret message recovered from Equation (3) will then be shown as the result 60 in FIG. 6 which comprises at least one mark "*" to replace the falsified part, while the rest part which are not changed can still be correctly shown. In this case, the recovered secret message 60 is shown as "******rd: 19841221", wherein the first secret segment being hacked is replaced by "*" while the second and the third secret segment can still be successfully recovered and shown.

As a result, to sum up, a new secret communication method with a self-authentication capability for secret data hiding in a spreadsheet using the information sharing technique is proposed. At the sender site, a secret message is transformed into secret shares by Shamir's (k, n)-threshold secret sharing scheme with n=k+1, and the generated (k+1) shares are embedded into the numeric data in the spreadsheet as if they are part of the spreadsheet content. At the receiver site, every k shares among the (k+1) ones then are extracted form the stego-spreadsheet to recover (k+1) copies of the secret, and the consistency of the (k+1) copies in value is taken to check and to determine whether the embedded shares are intact or not. Therefore, a novel type of blind self-authentication of the embedded secret message is achieved by the present invention.

Furthermore, by dividing the secret message into a plurality of segments and applying the same manners as set forth in the present invention to each segment, the secret sharing scheme, the integrity and fidelity of the hidden secret message can thus be verified, thereby achieving a new covert communication process with the double functions of information hiding and self-authentication.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:
1. A secret communication method with a self-authentication capability, comprising:
dividing a secret message into a plurality of secret segments;
converting each of said secret segments into (k+1) shares, wherein k is a positive integer;

randomly embedding said shares into a spreadsheet comprising a plurality of numeric data and substituting said shares for said numeric data;

selecting every k shares among said (k+1) shares to compute (k+1) copies in value; and checking if said (k+1) copies in value are the same.

2. The secret communication method with a self-authentication capability of claim 1, further comprising:

if said (k+1) copies in value are the same, showing said secret message.

3. The secret communication method with a self-authentication capability of claim 1, further comprising:

if said (k+1) copies in value are not the same, utilizing at least one mark to replace said secret message.

4. The secret communication method with a self-authentication capability of claim 1, wherein said secret shares are expressed by simultaneous equations containing a plurality of secret codes.

5. The secret communication method with a self-authentication capability of claim 4, wherein said secret codes are said (k+1) copies in value.

6. The secret communication method with a self-authentication capability of claim 4, wherein each equation of said simultaneous equations is divided by an initial reference value to obtain a remainder.

7. The secret communication method with a self-authentication capability of claim 6, wherein said initial reference value is a prime and said initial reference value is greater than said secret codes.

8. The secret communication method with a self-authentication capability of claim 7, wherein said secret message is recovered via an equation of $$F(x) = \begin{bmatrix} F(x_1)\frac{(x-x_2)(x-x_3)\ldots(x-x_k)}{(x_1-x_2)(x_1-x_3)\ldots(x_1-x_k)} + \\ F(x_2)\frac{(x-x_1)(x-x_2)\ldots(x-x_k)}{(x_2-x_1)(x_2-x_3)\ldots(x_2-x_k)} + \ldots + \\ F(x_k)\frac{(x-x_1)(x-x_2)\ldots(x-x_{k-1})}{(x_k-x_1)(x_k-x_2)\ldots(x_k-x_{k-1})} \end{bmatrix}_{mod\ p}$$

wherein $x_1, x_2 \ldots x_k$ are adjustable parameters, p is said initial reference value, $F(x_1), F(x_2) \ldots F(x_k)$ are said k shares in value, and $F(x)$ is said secret message.

9. The secret communication method with a self-authentication capability of claim 4, wherein said simultaneous equations are expressed as:

$$F(x_i) = (m_0 + m_1 x_i + m_2 x_i^2 + \ldots + m_{k-1} x_i^{k-1})_{mod\ p}$$

wherein $m_0, m_1 \ldots m_{k-1}$ are said secret codes, $x_i$ is adjustable parameter, p is an initial reference value and $F(x_i)$ is said secret share.

10. The secret communication method with a self-authentication capability of claim 9, wherein said initial reference value is a prime and said initial reference value is greater than said secret codes.

11. The secret communication method with a self-authentication capability of claim 1, wherein each of said secret segments are converted into (k+1) shares through a secret sharing technology.

12. The secret communication method with a self-authentication capability of claim 10, wherein said secret sharing technology is Shamir's (k, n)-threshold secret sharing scheme.

* * * * *